US012327254B2

(12) United States Patent
Singh et al.

(10) Patent No.: US 12,327,254 B2
(45) Date of Patent: *Jun. 10, 2025

(54) FLEXIBLE AUTHENTICATION

(71) Applicant: Wells Fargo Bank, N.A., San Francisco, CA (US)

(72) Inventors: Priyamvada Singh, San Francisco, CA (US); Jeff Cornman, San Francisco, CA (US); Melody Kao, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,255

(22) Filed: Jun. 18, 2024

(65) Prior Publication Data
US 2024/0338706 A1    Oct. 10, 2024

Related U.S. Application Data

(63) Continuation of application No. 18/310,323, filed on May 1, 2023, now Pat. No. 12,039,540, which is a
(Continued)

(51) Int. Cl.
G06Q 20/40      (2012.01)
G06Q 20/38      (2012.01)
H04L 9/40       (2022.01)

(52) U.S. Cl.
CPC ......... *G06Q 20/405* (2013.01); *G06Q 20/382* (2013.01); *G06Q 20/40145* (2013.01);
(Continued)

(58) Field of Classification Search
None
See application file for complete search history.

(56) References Cited

U.S. PATENT DOCUMENTS 5,892,900  A    4/1999   Ginter et al.
5,988,497  A    11/1999  Wallace
(Continued)

FOREIGN PATENT DOCUMENTS

JP        2010097467 A    4/2010

OTHER PUBLICATIONS

"A Method and System to Display a "Risk Level" Prior to Authentication", The IP.com Journal, Jan. 22, 2013, 3 pages, Available Online at https://priorart.ip.com/IPCOM/000225040.
(Continued)

*Primary Examiner* — Eduardo Castilho
(74) *Attorney, Agent, or Firm* — Kilpatrick Townsend & Stockton LLP

(57) ABSTRACT

Provided is dynamic and flexible authentication based on an interaction over a communications link between a user device and a financial entity. A set of interactions enabled at the user device are categorized into different levels, each level comprises a different authentication policy. At about the same time as an interaction is initiated at the device, an authentication policy assigned to the interaction is accessed and a security challenge is activated at the device. Based upon a successful response to the security challenge, an enablement of the communications link is continued. Based upon an unsuccessful response to the security challenge, the communications link is disabled.

20 Claims, 8 Drawing Sheets

Related U.S. Application Data continuation of application No. 15/009,917, filed on Jan. 29, 2016, now Pat. No. 11,816,672.

(60) Provisional application No. 62/221,970, filed on Sep. 22, 2015.

(52) U.S. Cl.
CPC .......... *H04L 63/08* (2013.01); *H04L 63/0807* (2013.01); *H04L 63/0861* (2013.01); *H04L 63/20* (2013.01); *G06Q 2220/00* (2013.01)

(56) References Cited

U.S. PATENT DOCUMENTS

| | | |
|---|---|---|
| 6,941,285 B2 | 9/2005 | Sarcanin |
| 7,668,776 B1 | 2/2010 | Ahles |
| 7,735,114 B2 | 6/2010 | Kwan et al. |
| 7,992,198 B2 | 8/2011 | Guarraci et al. |
| 8,060,915 B2 | 11/2011 | Voice et al. |
| 8,161,164 B2 | 4/2012 | Chong |
| 8,255,971 B1 | 8/2012 | Webb et al. |
| 8,281,375 B2 | 10/2012 | Von Krogh |
| 8,327,141 B2 | 12/2012 | Vysogorets et al. |
| 8,406,421 B2 | 3/2013 | Kamen et al. |
| 8,434,133 B2 | 4/2013 | Kulkarni et al. |
| 8,539,567 B1 | 9/2013 | Logue et al. |
| 8,572,391 B2 | 10/2013 | Golan et al. |
| 8,621,209 B1 | 12/2013 | Johansson et al. |
| 8,700,729 B2 | 4/2014 | Dua |
| 8,739,278 B2 | 5/2014 | Varghese |
| 8,762,268 B2 | 6/2014 | Wall et al. |
| 8,769,651 B2 | 7/2014 | Grajek et al. |
| 8,832,790 B1 | 9/2014 | Villa et al. |
| 8,875,267 B1 | 10/2014 | Kolman et al. |
| 9,760,697 B1 | 9/2017 | Walker |
| 10,108,791 B1 | 10/2018 | Masterman |
| 10,163,105 B1 | 12/2018 | Ziraknejad et al. |
| 11,816,672 B1 | 11/2023 | Singh et al. |
| 2002/0023164 A1 | 2/2002 | Lahr |
| 2002/0070844 A1 | 6/2002 | Davida et al. |
| 2004/0083394 A1 | 4/2004 | Brebner et al. |
| 2004/0103296 A1 | 5/2004 | Harp et al. |
| 2006/0282660 A1 | 12/2006 | Varghese et al. |
| 2007/0143825 A1 | 6/2007 | Goffin |
| 2008/0034411 A1 | 2/2008 | Aoyama |
| 2009/0234683 A1 | 9/2009 | Anderson et al. |
| 2010/0114776 A1 | 5/2010 | Weller et al. |
| 2010/0299716 A1 | 11/2010 | Rouskov et al. |
| 2011/0225625 A1 | 9/2011 | Wolfson et al. |
| 2011/0265147 A1 | 10/2011 | Liu |
| 2013/0160144 A1 | 6/2013 | Mok et al. |
| 2013/0262858 A1 | 10/2013 | Neuman et al. |
| 2014/0046844 A1 | 2/2014 | Grigg |
| 2015/0220907 A1 | 8/2015 | Denton et al. |
| 2015/0254446 A1 | 9/2015 | Lacous et al. |
| 2016/0021117 A1 | 1/2016 | Harmon et al. |
| 2016/0094551 A1 | 3/2016 | Sugihara et al. |
| 2016/0112397 A1 | 4/2016 | Mankovskii |

OTHER PUBLICATIONS

"Matrix", Definition, Mar. 23, 2015, 2 pages, Available Online at https://web.archive.org/web/20150323033953/https://techterms.com/definition/matrix.

Aronowitz et al., "Multi-Modal Biometrics for Mobile Authentication", IEEE International Joint Conference on Biometrics, Sep. 2014, pp. 1-8, IEEE.

Babu et al., "A Dynamic Authentication Scheme for Mobile Transactions", International Journal of Network Security, vol. 8, No. 1, Jan. 2009, pp. 59-74.

Bakar et al., "Adaptive Authentication: Issues and Challenges", 2013 World Congress on Computer and Information Technology (WCCIT), Oct. 3, 2013, pp. 1-6.

Djedid, "A Trust-based Security Mechanism for Nomadic Users in Pervasive Systems", arXiv [cs.CR], Dec. 18, 2012, 7 pages.

Kumar et al., "Using Continuous Biometric Verification to Protect Interactive Login Sessions", 21st Annual Computer Security Applications Conference (ACSAC'05), 2005, 10 pages.

Muther, "Strong Risk-based Authentication without Human Intervention", The IP.com Journal, Available Online at URL: https://priorart.ip.com/IPCOM/000228058, Jun. 4, 2013, 4 pages.

Nenadic et al., "Levels of Authentication Assurance: an Investigation", Third International Symposium on Information Assurance and Security, Aug. 31, 2007, pp. 155-160.

Rabuzin et al., "The Concept of Complex Events as Suitable Means for Biometric System Implementation", International Multi-Conference on Computing in the Global Information Technology, Mar. 2007, 4 pages.

Rocha et al., "A2best: an Adaptive Authentication Service Based on Mobile User's Behavior and Spatio-temporal Context", IEEE Symposium on Computers and Communications (ISCC), Aug. 18, 2011, pp. 771-774.

Shah et al., "Multi-factor Authentication as a Service", 3rd IEEE International Conference on Mobile Cloud Computing, Services, and Engineering (MobileCloud), Mar. 2015, pp. 144-150.

White, "How Computers Work, 7$^{th}$ Edition," Oct. 15, 2003, Que Publishing.

Witte et al., "Context-Aware Mobile Biometric Authentication based on Support Vector Machines", Fourth International Conference on Emerging Security Technologies, Sep. 2013, 5 pages.

Yao et al., "Quantifying Authentication Levels of Assurance in Grid Environments, Information Assurance and Security (IAS)," 2010 Sixth International Conference; Aug. 23-25, 2010, pp. 298-303, IEEE.

FLEXIBLE AUTHENTICATION

CROSS-REFERENCE TO RELATED APPLICATION

This application is a continuation of and claims priority to U.S. patent application Ser. No. 18/310,323 filed May 1, 2023, and entitled "FLEXIBLE AUTHENTICATION," which is a continuation of U.S. patent application Ser. No. 15/009,917 filed Jan. 29, 2016, issued as U.S. Pat. No. 11,816,672 on Nov. 14, 2023, and entitled "FLEXIBLE AUTHENTICATION," which claims the benefit of U.S. Provisional Patent Application No. 62/221,970, filed Sep. 22, 2015, and entitled "FLEXIBLE AUTHENTICATION." The entirety of both of which is incorporated herein by reference.

BACKGROUND

Advances in communication technology has allowed businesses and individuals to perform transactions online (e.g., over the Internet). At times, confidential or sensitive information may need to be shared in order for the transaction to be initiated, or in order to provide necessary information for the transaction to complete successfully. In an attempt to secure the confidential and/or sensitive information, authentication is used. Authentication is the process of determining whether a person is the actual person they are asserting themselves to be. A common type of authentication is based on logon passwords or other credentials, which may be subject to fraud. On the user side, an occurrence of fraud (e.g., compromised financial data, monetary loss, identity theft, and so on) as well as the need to provide authentication information (e.g., enter a temporary pass code or one time password) have been blamed for user dissatisfaction. On the organizational or network side, the occurrence of fraud is a concern when authenticating devices and users associated with the devices.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

An aspect relates to a system that includes a processor that executes computer executable components stored in a memory. The computer executable components may include a categorization manager that divides financial interactions into tiers. The computer executable components may also include an administration manager that assigns respective authentication policies to each tier of the tiers. Each tier may have a different authentication policy. Further, the computer executable components may include an activation manager that activates a security challenge at a user device based on an interaction and an authentication policy of the respective authentication policies assigned to the interaction. The security challenge may be output at the user device based on the activation. The computer executable components may also include an approval component that selectively authorizes the interaction based on a response to the security challenge.

Another aspect relates to a method that includes categorizing, by a system comprising a processor, financial interactions into different levels of authentication. The financial interactions may be performed at a device and enabled over a communications link to a financial entity. The method may also include designating, by the system, an authentication policy for each level of authentication. Each level of authentication may be designated with a different authentication policy. Further, the method may include evaluating, by the system, an interaction being performed at the device and activating, by the system, a security challenge at the device as a result of the evaluating. The method may also include selectively approving, by the system, performance of the interaction at the device based on a response to the security challenge.

A further aspect relates to a computer-readable storage device storing executable instructions that, in response to execution, cause a system comprising a processor to perform operations. The operations may include dividing financial interactions into tiers. The financial interactions are interactions capable of being performed through an interaction with a device that communicates with a financial entity over a communications link. The operations may also include assigning respective authentication policies to each interaction of the financial interactions. Each interaction may be assigned a different authentication policy. Further, the operations may include activating at the device a security challenge based on an identified interaction of the financial interactions and an authentication policy assigned to the identified interaction. According to an implementation, the operations may include continuing an enablement of the communications link based on receipt of an approved response to the security challenge. Alternatively, the operations may include disabling the communications link based on receipt of an unapproved response to the security challenge.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
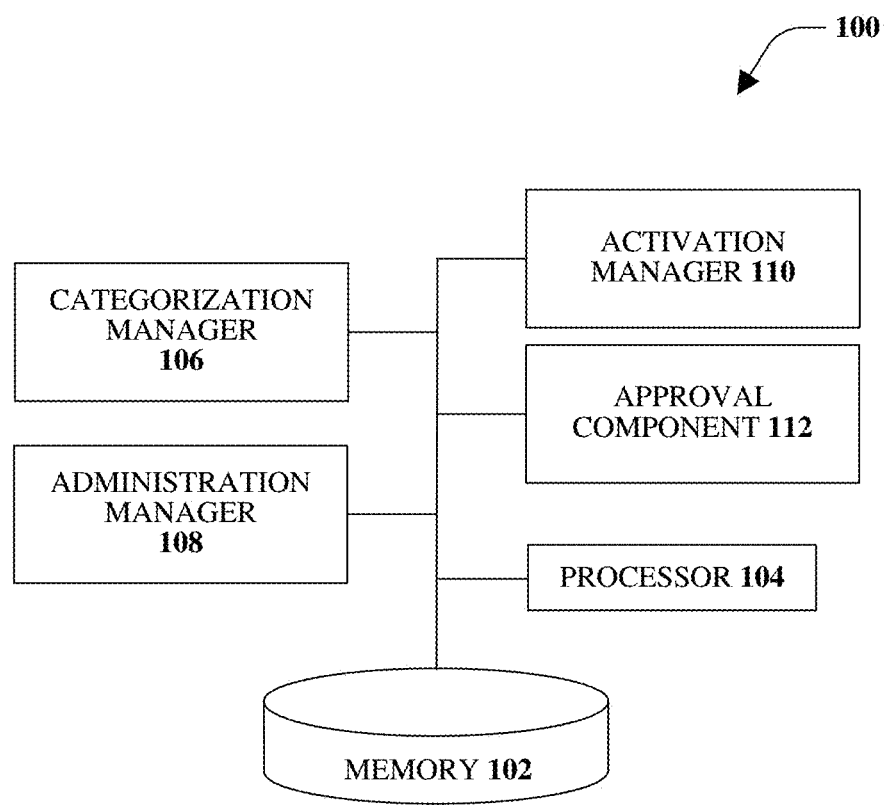
FIG. 1 illustrates an example, non-limiting, system configured for flexible authentication, according to an aspect.

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

The various aspects disclosed herein provide dynamic risk based access and/or tiered level risk access based on risk identifiers, interaction type risk segmentations, and/or a confidence level associated with the interaction. Dynamic authentication may be based on various drivers (e.g., external threats). For example, if a third party authenticator (e.g., third party token) is utilized to provide lower level interactions and/or lower risk, and if there is some perceived vulnerability to the third party token, the level of authentication necessary may be dynamically increased, according to an aspect. The level of authentication may be based on internal and/or external fraud detection anomalies. Therefore, if the pattern or anomaly indicates heighted risk, the authentication level may be increased. The level may also be based on device intelligence, location, and/or other parameters that are utilized to alter the dynamic authentication capability.

For example, based on a determination of a security level, a single action, or two or more actions, may be necessary to continue a transaction. For example, a security challenge may be activated and passively (e.g., without user action) or actively (e.g., an action taken by a user) responded to in order for the transaction to continue. For example, based on the level of risk, activation of a security challenge is implemented, such as at a user device. Therefore, the user may be prompted to respond to the security challenge. For example, the activation may cause the security challenge to be output to the user (e.g., through the user device) and enables a wireless connection between the user device and the server associated with a financial entity (or other type of entity such as an authentication entity). A correct response to the security challenge over the wireless connection allows to interaction to continue at the user device through which the interaction is being performed. An incorrect response to the security challenge over the wireless connection terminates the interaction, pauses the interactions, conveys an error message, or another action that does not allow the interaction to continue.

As used herein a "user" refers to a customer of the financial entity and/or one or more devices managed by the customer. In some aspects, the "user" may be a rogue user attempting to fraudulently gain financial access by impersonating actual customers of the financial entity. An "entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution. Further, an "interaction" may be any touch point or transaction between the financial institution and the user.

FIG. 1 illustrates an example, non-limiting, system 100 configured for flexible authentication, according to an aspect. The flexible authentication may take into account a level of risk associated with an interaction and/or a level of confidence associated with the interaction. For example, if the level of risk is low and the level of confidence is high, the interaction may be allowed without further action. In another example, if the level of risk is medium and the level of confidence is high, the interaction may be allowed without further action, or with a simple, low-level action. In a further example, if the level of risk is high and the level of confidence is low, one or more further actions may be necessary for the interaction to continue. Further, the flexible authentication may be dynamic such that one set of indicators might trigger a challenge on one day, but the same set of indicators might not trigger a challenge on the next day because values associated with those indicators have changed.

The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the memory 102 (e.g., operatively connected to the memory 102), the various aspects are not limited to this implementation. Instead, in accordance with various implementations, the one or more computer executable components and/or the one or more computer executable instructions may be stored in (or integrated within) the memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system may also include a categorization manager 106 that may be configured to categorize various functions and activities associated with the interactions into levels or tiers. For example, when a user (e.g., through a user device) interacts with a website and/or an application associated with the financial entity, the user may be able to perform various function (e.g., view account balances, transfer money, wire money, apply for a loan, and so on). Each of the functions and/or activities may be assigned to a respective tier or level of potential risk. For example, an activity such as viewing an account balance may be classified by the categorization manager 106 as having a low level of risk and, thus, may be assigned to a first tier (e.g., tier 1). If the user is attempting to withdraw money, the interaction may be classified by the categorization manager 106 as having a medium level of risk and, thus, the interaction may be assigned to a second tier (e.g., tier 2). In a further example, if the user is attempting to wire money, over a threshold dollar amount, to a foreign country, the interaction may be classified as a high level of risk and, thus, may be assigned to a third tier (e.g., tier 3). It should be noted that although only three levels or risk or three tiers are discussed herein, other levels of risk and/or tiers might be utilized. Further, each level of risk and/or tier may be subdivided into subcategories. This subdivision may be based on parameters of the interaction (e.g., actions that the user historically performs) and/or based on levels of risk and/or confidence assigned to the interaction.

An administration manager 108 may be configured to assign authorization policies to each tier. According to some implementations, each tier may have a different authorization policy. Further, if a tier has been subdivided into subcategories, each subcategory may be assigned a different authorization policy. It should be noted that in some cases, the different policies (of the tiers and/or subcategories) might have some overlap. The authorization policies may be user authentication policies, wherein the policy relates to verifying that the user attempting to perform the transaction is the actual customer and not a rogue user.

Also included in the system 100 may be an activation manager 110 that may be configured to activate a security challenge at a user device based on the assigned respective authentication policy. The security challenge is output at the user device based on the activation of the security challenge. The security challenge may utilize passive authentication and/or active authentication.

For passive authentication (e.g., performed by the device without user action), the output may include a request to the device to provide information. The information may include device identification or other device parameters. In another example, the information may include an external security token, a secure token, a session token, and so on. In a further example, the information may include the device capturing biometric information from the user without the user needing to be aware, and so on.

For active authentication, the security challenge may be displayed or output in another format, such as audio, for active participation by the user. For example, the user may be instructed to speak in order to provide a voiceprint. In another example, the user may be instructed to take a picture of their face, eye, or a finger for other types of biometric input. In some instances, the user may answer one or more security questions or may provide another response to the security challenge.

An approval component 112 may be configured to authorize access to the requested banking functions and/or activities (e.g., the interaction) based on a response to the security challenge. For example, the access may be authorized for banking functions and activities in a tier if a third party authentication token mapped to that tier is provided. In another example, the interaction may be allowed to occur if a biometric provided matches predefined biometrics associated with the user.

If the access is authorized by the approval component 112, a connection between the user device and a financial server is enabled (or its enablement is continued). Such enablement may be over a wireless link, for example. Further, the enablement of the connection allows the interaction to be continued at the user device. If the access is not authorized by the approval component 112, the session may be terminated, paused, or another action taken including outputting an error message based on the incorrect response.

Figure 2:
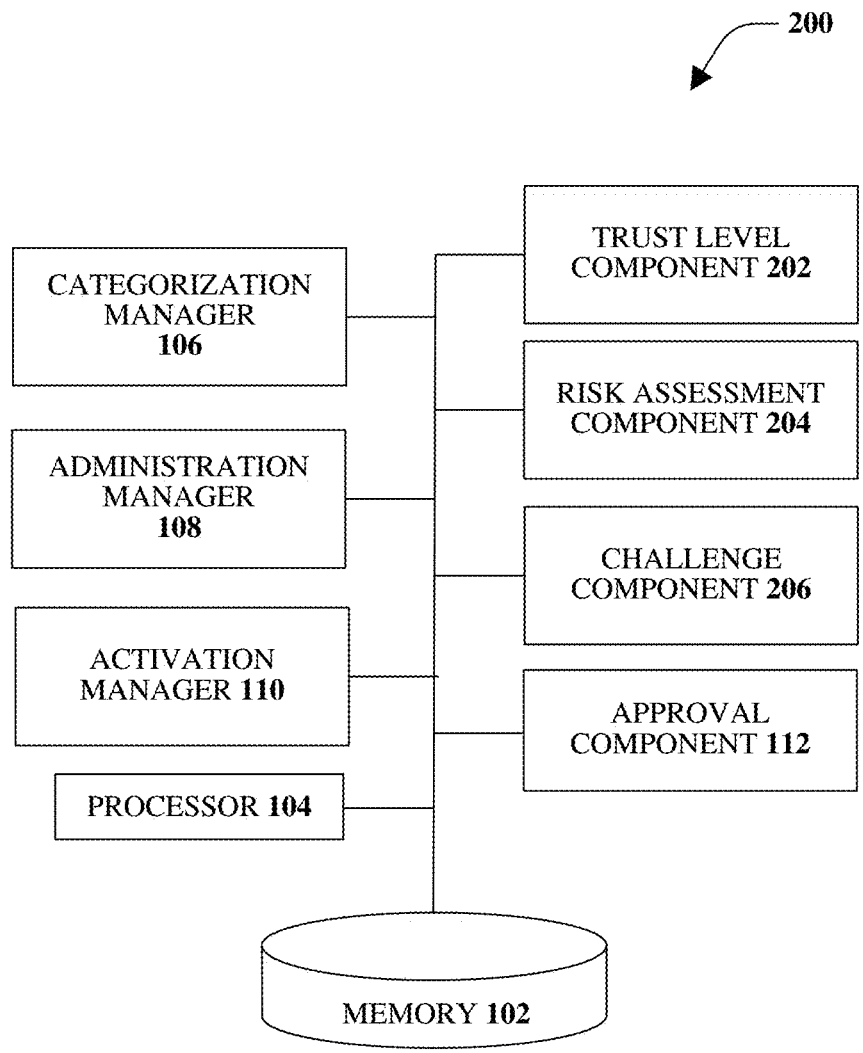
FIG. 2 illustrates another example, non-limiting system configured for flexible authentication, according to an aspect.

FIG. 2 illustrates another example, non-limiting system 200 configured for flexible authentication, according to an aspect. The system 200 may include a trust level component 202 that may be configured to determine a level of confidence related to whether a user attempting to perform (or performing) a transaction with an entity is an authorized user. The trust level component 202 may be configured to determine the level of confidence in real time (e.g., at substantially the same time as the interaction is initiated or being performed). The confidence level may be based on various factors including, but not limited to, the device being used to perform an interaction, a detected location of initiation of the interaction, historical data, and so on.

For example, a determination may be made by the trust level component 202 whether the interaction request has been received from a known device (e.g., a device bound to an authorized user) or whether the device is unknown (e.g., an unrecognized device is being used). The determination may be made based on information automatically received from the device or provided in response to a request for information. If the device is known, the confidence level may be high. However, if the device is not recognized, the confidence level may be low.

In another example, a determination may be made where the initiation of the interaction is being made from (e.g., a location of the user). If the location is an expected location (e.g., home, office, city of residence, a known travel location, and so on), the level of confidence may be high. However, if the location is an unexpected location (e.g., a portion of town where the user has never been known to travel to, a different state, another country, and so on), the level of confidence assigned to the interaction may be low. According to some implementations, if there is an uncertainty based on one or more parameters (e.g., device is recognized but location is not somewhere the user has historically visited), the level of confidence may be somewhere between a low level and a high level (e.g., a sliding scale).

A risk assessment component 204 may be configured to assign a level of risk to the interaction. The risk assessment component 204 may utilize a set of rules and/or a set of policies associated with transactions in order to assign the level of risk. The set of rules and/or policies may be predetermined based on business values (or other types of values) associated with each type of interaction that may be performed. In some implementations, a transaction amount, historical patterns, authentication type, or combinations thereof may be utilized to assign the risk level. For example, a low risk function may be an interaction being performed within an electronic web site associated with the financial entity (e.g., reviewing balances, transferring monies between accounts, and so on). A medium risk transaction may be a movement of currency that is below a defined threshold, payments (e.g., bill payments) that conform to an established pattern based on historical information, and so forth). In a further example, a high-risk transaction may be a movement of currency that is above the defined threshold, an anomaly observed based on a historical pattern, and so on. It should be understood that other risk levels and/or types of transactions may be utilized with the disclosed aspects and these examples (as well as other examples herein) are provided for purposes of describing the various aspects.

In accordance with some aspects, the level of risk may be based on external parameters. An external parameter may include a level of fraud across at least a segment of users based on a type of interaction. For example, fraud related to wire transfers over a certain dollar amount and where a recipient is in a particular country may be identified and similar transactions may be determined to have an increased level of risk. Another external parameter may include a location where the interaction is being initiated (e.g., a location where there is Internet access available, a location where one or more financial interactions may occur, and so on). Thus, if there is an increase of fraud previously detected at a certain location, interactions that are originating from that location (or where a recipient is located) may be assigned a higher level of risk than would be assigned if the transaction was originating from (or ending at) a different location.

Based on the defined level of risk and/or the confidence level, a challenge component 206 may be configured to selectively request additional authentication, which may be activated by the activation manager 110. For example, for a transaction that is low risk and has a high level of confidence, the transaction may be allowed without the need for additional authentication. In another example, for a transaction that is medium risk and has been assigned a medium level of confidence, additional authentication, such as a request for biometric identification or another form of authentication (e.g., a third party token) may be requested. According to a further example, for a high-risk transaction, regardless of the confidence level, authentication in the form of biometric information and/or a third party token may be necessary in order to complete the interaction. In some implementations, two or more different types of authentication may be needed to continue the interaction.

Figure 3:
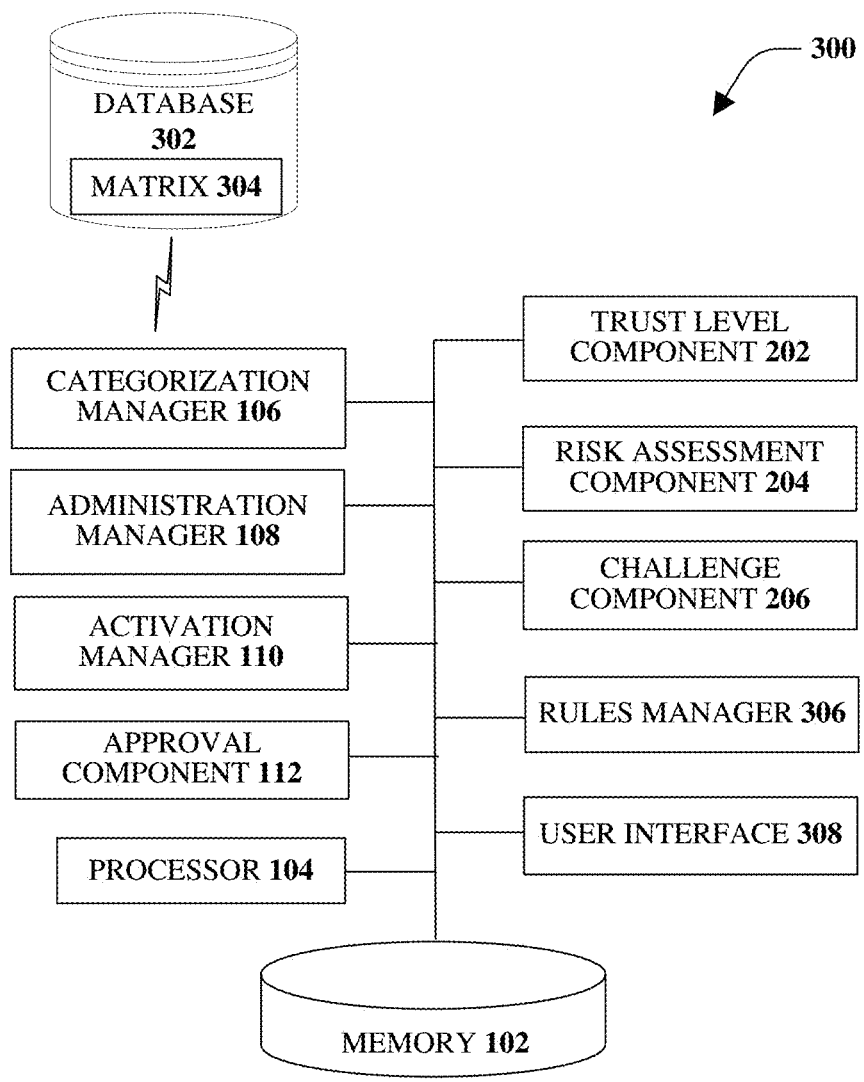
FIG. 3 illustrates an example, non-limiting, system configured for dynamic adaptive authentication, according to an aspect.

FIG. 3 illustrates an example, non-limiting, system 300 configured for dynamic adaptive authentication, according to an aspect. The system 300 may be configured to provide authentication that is flexible. Further, the system 300 may be context sensitive and may distinguish between different types of context. Context analysis may take into account various parameters such as the device (e.g., the user device) being used for the interaction, the risk of the interaction itself, other characteristics or intelligence about the session (e.g., a location, a trend), and so on.

The categorization manager 106 may be configured to perform risk segmentation for various interactions that may be performed with an electronic banking system (e.g., a website associated with a financial entity). For example, a database 302 may be associated with (or accessible by) the categorization manager 106. Although illustrated as separate from the categorization manager 106, the database 302 may be included, at least partially, in the categorization manager 106. According to some implementations, the database 302 may be included, at least partially in the memory 102 (or another component of the system 300).

The database 302 may include a matrix 304 that contains the various interactions that may be performed within a session. As it relates to a financial entity, the interactions may include viewing a current balance, performing monetary transactions (withdraw, deposit, transfer, wire, and so on), changing profile information (e.g., address, email alias, and so on), applying for a loan, making a payment, requesting a loan, pricing insurance, and so forth.

According to some implementations, there may be a centralized set of rules that embodies the matrix 304. The centralized set of rules may determine the risk level supported by each interaction that might possibly occur in a session. As interactions occur within the session, the rules are referenced (in real-time or at run time) based on the level of risk of the interaction, which is defined in the matrix 304. This may be dynamic in the sense that rules for a certain level of risk might indicate that additional authentication is needed only if there is a high-risk location detected and a new device (not known for this user is detected). Further, there is not just one dimension for the rules, instead the risk segmentation is based on the rules (e.g., context based).

Each of the interactions may be assigned a risk segmentation by the categorization manager 106. According to some implementations, each type of interaction may be assigned a different risk segmentation based on criteria including, for example, threshold monetary levels, frequency, and so on. For example, if an email alias associated with a user is change and within a few hours or days another interaction, such as a monetary wire transfer is initiated (when there had not previously been a wire transfer on the account), the risk level may increase and/or the confidence level may decrease.

For example, a granularity of the matrix 304 may relate to a level of risk and/or a confidence level, according to an aspect. For example, if a level of risk is low and a confidence level is high, there may be no differences for the level of authentication in the matrix 304 for the various interactions at this level. However, if the level of risk is high and a confidence level is medium, various interactions at this level may be subdivided within the matrix. Thus, one interaction at this level may be associated with a single authentication, while a second interaction at this level may be associated with two different authentications (e.g., a fingerprint and a voiceprint, facial recognition and the answer to a predefined security question). In some implementations, more than three or more authentications may be requested and successful responses allow the interaction to continue. According to some implementations, at least one answer to the security question is performed passively (without user action) and at least one answer to another security question (or the same security question) is performed actively (with user action).

The trust level component 202 may determine the level of confidence associated with a particular session and/or a particular interaction within the session at substantially the same time as the interaction is being performed. Based on the combination of the risk of the transaction and the level of confidence for the session, a determined level of authentication may be needed to continue the interaction and/or the session. For example, a determination may be made whether the interaction is being performed through a known device that is bound (e.g., associated with) an identified user, or whether the interaction is being performed from a device that is not known (e.g., the user has not previously used the device, it is a new device, it is a device of a rogue user or fraudster, and so on).

For a low risk interaction, which may include interactions such as logging into the financial website, a basic review of account balance, or other less significant information (e.g., information that is not highly confidential or highly sensitive), a method of authentication may include an external or third party authentication. For example, the financial institution may have partners with various social media websites or other websites, and may leverage the information from those partner websites to obtain the token. In an example, a centralized entity may provide the interaction between the third party website, the third party token, and the financial institution (or the financial institution website).

For a medium risk interaction, which may include interactions such as viewing confidential or sensitive information, routine transactions under a predetermined dollar amount, bill payments that are already an established pattern, and so on, a method of authentication may include biometric information collection. The biometric information collection may be performed passively without the user being aware the biometric information is being collected. In another implementation, the biometric information collection may be performed actively, wherein the user has to perform an action (e.g., press his finger on a screen to collect a fingerprint, look directly into a camera to collect an iris scan, talk for voice recognition, and so on).

For a high-risk interaction, such as a high value transfer, an unusual or unexpected one-time activity, and so on, the method of authentication may include biometric information collection combined with an additional authentication type. Examples of additional authentication types may include, but are not limited to, a one-time code, a token, an external token, a third party token (soft/hard), answers to one or more predefined security questions, and so forth.

Thus, the system 300 may provide granular segmentation of the interactions that may be performed through interaction with the financial website and rules may be applied based on the type of authentication that is adequate for the interaction at a certain level of risk. Further, a second level of complexity may be applied, wherein a user has to explicitly perform an action to authenticate themselves based on other contexts and indicators (e.g., the characteristics of a device).

In an example of a low risk transaction, a user would like to view balances and any upcoming bill payments that are coming due in the next few weeks. If the user is attempting to perform the interaction with a bound device (e.g., a device previously confirmed to be associated with the user), the user may be able to perform the interactions without needing to log onto the mobile application. This is because previously there was a high level of confidence associated with the authentication, wherein the user logged into the mobile banking session using a user name/password pair (or other type of authentication) and the device information was captured at that time. In this case, there is some level of confidence that the device belongs to the previously identified user and there is nothing suspicious about the device. This also provides the user easy access to high-level balances and other high-level information.

If the low risk transaction turns into a higher risk transaction, an additional form of authentication might be requested. For example, the transaction may turn into a higher risk transaction when the user attempts to make a payment, a wire transfer, or wants to send a payment to a new recipient. The transaction may also be determined to be higher risk if the device is determined to be located in another state or country where the user has never been known to travel to, and so on. Thus, an authentication challenge may be output, which might require action by the user, or might be performed automatically if the information is able to be dynamically or automatically obtained.

As illustrated, the system 300 may include a rules manager 306 that may be configured to provide a rules based framework, which may enable a "plug and play" type approach to the authentication challenge. The rules based framework may be determined as a function of the risk assigned for the user. Further, the rules based framework may be flexible and may provide additional intelligence on various external based risk factors that may be dynamic in terms of external treats that have been detected.

For example, if it is detected that there has been a wave of suspicious logins within a short period of time, the system 300 may dynamically increase the authentication requirements. Additionally or alternatively, the system 300 may decrease the risk tolerance if it is determined there is more risk in the environment at the current time. Some of the changes to the authentication requirements and/or risk tolerance may be a function of what the user is doing and in other cases it might be driven by external risk indicators.

Thus, the centralized framework may allow, based on external dynamics or other parameters, the system 300 to tune up, or tune down, what is needed across the financial website. Thus, there may be a logic step such that when the risk increases across the session, there is a need for additional authentication. This may be based on the scenario (e.g., the location where the user is located), the transaction type, or other parameters. In some implementations, it may be a combination of more than one parameter (e.g., location and transaction type, transaction type combined with location and historical data, and so on) that may drive the level of risk indication.

For example, the device is recognized but the location where the user is determined to be located is unknown (e.g., the user has not performed interactions at that location before). Further to this example, the user is performing a transaction that conforms with historical transaction trends for that user (e.g., what is expected) and all other risk indicators suggest it is the customer (e.g., nothing suspicious). In this case, although the location is unknown, the transaction may be considered low risk since the other parameters conform to historical data about the user. Thus, the interaction may be allowed without additional authentication (e.g., no challenge for enhanced authentication is output).

In another example, the device is recognized and the location is unknown (e.g., not previously associated with this user). Further, the transaction type, amount, and/or another parameter (e.g., unknown recipient of transferred funds, funds are being wired out of the country, and so on) is suspicious. In this case, there may be an external threat or a person may be hacking into an account of someone else (e.g., device has been stolen). Thus, a security challenge may be activated, which causes the security challenge to be output at the device. This in turn enables a connection between the mobile device and the financial website or server (or a third party server) over a wireless link (or a wired link) to selectively continue or abort the transaction at the device. Thus, if the security challenge is answered correctly, the transaction is allowed. However, if the security challenge is not answered correctly, the transaction is aborted.

As it relates to a medium level of risk, there may be a two-tier risk scenario where a security challenge associated with enhanced authentication may rely on biometrics. The manner of the challenge may be modular and one type of authentication method may be exchanged with another method. The change between challenges may be a function of what is available for the user at the time of the challenge. For example, if a voiceprint or face print is available and registered for that user, the challenge may relate to voice or facial recognition. However, that information may not be available for another user and, therefore for an interactions associated with the other user, another form of a challenge is output. Thus, the system 300 may revert to business rules that indicate a suite of acceptable authentication methods that might be used in that scenario.

Further, the type of authentication challenge may be customer specific or based on customer preferences. Thus, different types of authentication for the same level of risk may be based on which forms of biometric information are available, what forms of identification are registered, and so on. In one example, the user may have laryngitis and may not be able to answer a security challenge related to vocal recognition. Therefore, in this example, the user may request that the system not use vocal recognition if a security challenge and response is necessary.

Further, the system 300 might allow the user to choose from the available mechanisms to authenticate. For example, the user may interact with a user interface 308 to select the authentication mechanism. According to some implementations, the user interface 308 (as well as other interface components discussed herein) may provide a graphical user interface (GUI), a command line interface, a speech interface, Natural Language text interface, and the like. For example, a GUI may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or API. In addition, the command line interface may be employed in connection with hardware (e.g., video cards) and/or displays (e.g., black and white, and EGA) with limited graphic support, and/or low bandwidth communication channels.

According to some implementations, the user may provide information (e.g., through the user interface 308) related to future events. For example, the user may provide information related to an upcoming vacation (e.g., travel to Europe for the month of October). In another example, the user may provide information related to a future purchase (e.g., I am financing a high-end sports car with a private entity, or I plan to buy stock in these three companies). This information received from a user (at a time when there is a high confidence that it is in fact the user) may be utilized as at least one parameter of the flexible authentication analysis as discussed herein.

Figure 4:
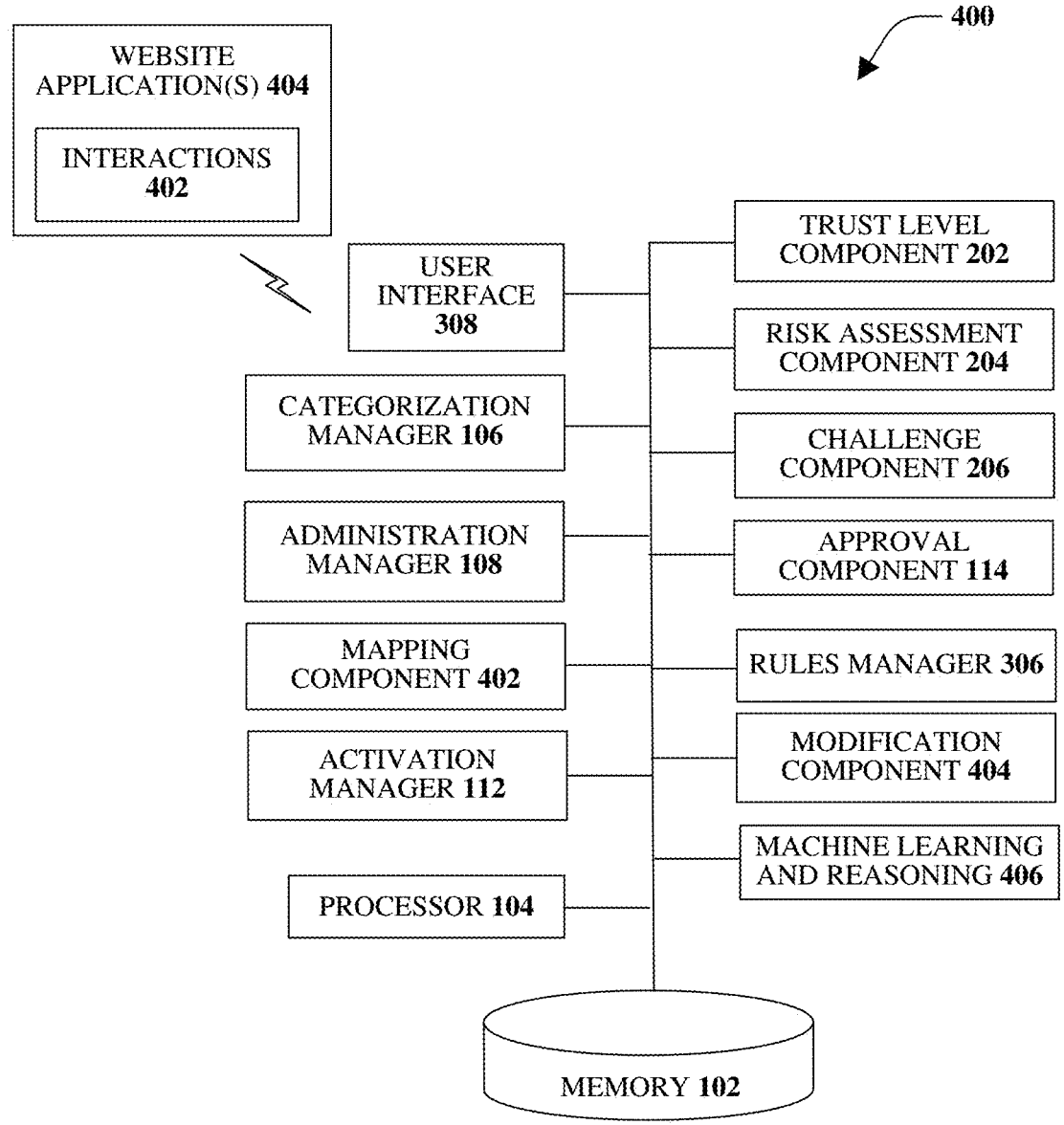
FIG. 4 illustrates an example, non-limiting system configured for dynamic risk based access, according to an aspect.

FIG. 4 illustrates an example, non-limiting system 400 configured for dynamic risk based access, according to an aspect. The various aspects disclosed herein may provide the dynamic risk based access based on a tiered level of access. The tiered level of access may be based on risk patterns, transaction type risk segmentation, and/or dynamic drivers. These dynamic drivers may include external threats, fraud detection, device intelligence, location content, and so forth.

As illustrated, the categorization manager 106 may be configured to evaluate interactions 402 (e.g., touch points, transactions, activities, and so forth) that maybe performed through interaction with one or more website applications 404. For example, the user may interact with the website application 404 through the user interface 308. The evaluation of the interactions 402 may be performed a priori based on the capabilities and functionalities associated with the one or more website applications 404. In another example, the evaluation of the interactions 402 may be performed in real-time, wherein a certain interaction may be associated with a set of sub-categories and one sub-category from the set is selected based on parameters of the current interaction.

The administration manager 108 may be configured to assign authorization policies to each tier, wherein each tier may have a different authorization policy. In some instances two or more authorization policies may have at least one element in common (e.g., two or more authorization policies utilize a third party token, two or more authorization policies utilize a similar biometric, and so on).

For example, a first tier may be assigned a first authorization policy based on a first level of confidence and/or a first level of risk, as determined by the trust level component 202 and the risk assessment component 204 (or another system component). If the interaction falls within the first tier and is assigned a second level of confidence and/or a second level of risk, a second authorization policy may be assigned to the interaction by the administration manager 108. Further authorization policies may be assigned to the first tier depending on the confidence level and/or risk level of the transaction being performed.

Depending on the authorization policy, an external token and/or third party token may be needed as at least a portion of a security challenge. Thus, a mapping component 402 may be configured to link a third party authentication token to a tier. The respective third party authentication token may be used for authentication to the associated tier. Further, when the token is linked to the tier, the token may be used as a form of authentication for that tier.

A modification component 404 may be configured to adjust one or more authentication policies and/or token mappings based on various criteria. Such criteria may include fraud measures, third party token trust, and so forth.

Automated learning may be employed to facilitate one or more of the disclosed aspects. For example, a machine learning and reasoning component 406 may be utilized to automate one or more of the disclosed aspects. The machine learning and reasoning component may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component may employ principles of probabilistic and decision theoretic inference. Additionally or alternatively, the machine learning and reasoning component may rely on predictive models constructed using machine learning and/or automated learning procedures. Logic-centric inference may also be employed separately or in conjunction with probabilistic methods.

The machine learning and reasoning component may infer a level of risk and/or a level of confidence by obtaining knowledge about the possible actions and knowledge about internal influences (e.g., the user, the device, the application/program context), external influences (e.g., fraud trends, increased risk at a particular location), or combinations thereof. Based on this knowledge, the machine learning and reasoning component may make an inference based on which authorization policy to implement, which security challenge to output, whether to accept the response to the security challenge, the number of security challenges to request, or combinations thereof.

As used herein, the term "inference" refers generally to the process of reasoning about or inferring states of the system, a component, a module, the environment, and/or user devices from a set of observations as captured through events, reports, data and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

If the machine learning and reasoning component has uncertainty related to a response to the security challenge, the machine learning and reasoning component may automatically engage in a short (or long) dialogue or interaction with the user. In accordance with some aspects, the machine learning and reasoning component engages in the dialogue with the user through another system component. Computations of the value of information may be employed to drive the asking of questions.

The various aspects (e.g., in connection with assigning tiers, assigning security challenges, requesting more than one security challenge response, evaluating historical information, and so forth) may employ various artificial intelligence-based schemes for carrying out various aspects thereof. For example, a process for determining if a particular interaction should have a heightened level of security may be enabled through an automatic classifier system and process.

A classifier is a function that maps an input attribute vector, x=(x1, x2, x3, x4, xn), to a confidence that the input belongs to a class. In other words, f (x)=confidence (class). Such classification may employ a probabilistic and/or statistical-based analysis (e.g., factoring into the analysis utilities and costs) to prognose or infer an action that should be employed to determine what interactions should be automatically performed without security challenges and what interactions should have security challenges and the number and level of those security challenges. In the case of interactions, for example, attributes may be identification of a user device and/or the user and the classes are criteria related to known information (e.g., historical information) about the user device and/or user.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing fraud trends, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria when to implement a security challenge, which security challenge to implement, and so forth. The criteria may include, but is not limited to, fraud trends, historical information, expected interactions, and so forth.

Additionally or alternatively, an implementation scheme (e.g., a rule, a policy, and so on) may be applied to control and/or regulate interactions and resulting authorization policies, security challenges, and so forth. In some implementations, based upon a predefined criterion, the rules-based implementation may automatically and/or dynamically respond to security challenges. In response thereto, the rule-based implementation may automatically interpret and carry out functions associated with the interaction by employing a predefined and/or programmed rule(s) based upon any desired criteria.

Methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 5:
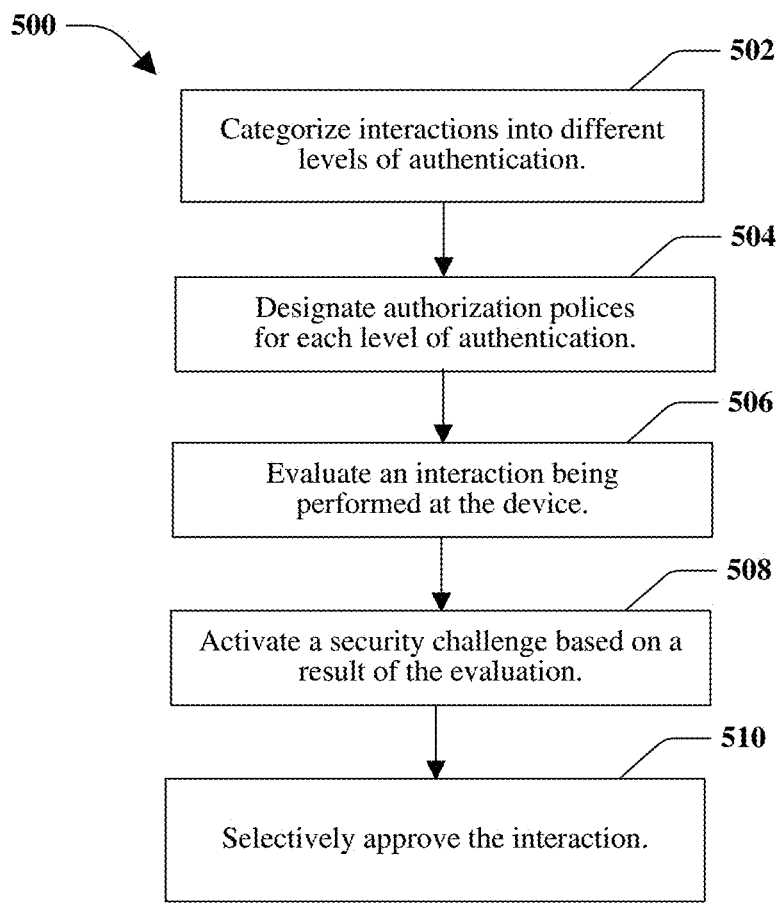
FIG. 5 illustrates an example, non-limiting method for providing flexible authentication, according to an aspect.

FIG. 5 illustrates an example, non-limiting method 500 for providing flexible authentication, according to an aspect. The method 500 in FIG. 5 may be implemented using, for example, any of the systems, such as the system 100 (of FIG. 1), described herein.

Method 500 starts at 502 when financial interactions are categorized into different levels of authentication. The financial interactions are the interactions that may be performed at a device and enabled over a communications link to a financial entity. Thus, the financial interactions may be those activities, transactions, and so forth that may be performed utilizing one or more financial websites of a financial entity and/or associated websites. As new interactions are developed over time, the new interactions may be categorized into respective levels of authentication.

At 504, an authentication policy is designated for each level of authentication. Each level of authentication may be designated with a different authentication policy. According to some implementations, two or more authentication policies have at least one level of overlap within the respective authentication policy. For example, a first level of authentication may utilize an external token and a second level of authentication may utilize a security token and a predefined security question (e.g., where did you go to high school?, what is the name of your first pet?, and so on). Thus, in this example, the external token is used for both the first level of authentication and the second level of authentication. According to some implementations, there is no overlap between the various authentication policies.

At 506, an interaction being performed at the device is evaluated. This evaluation may occur at substantially the same time as the interaction is initiated or at one or more other times during the interaction. For example, the interaction may be a current interaction (e.g., viewing balances, withdrawing money, applying for insurance, and so on). The interaction may be evaluated based on parameters associated with the device (e.g., is this a registered device, is this a non-registered device?, is this a device of a family member or related user?, and so on). According to another implementation, the interaction may be evaluated based on parameters associated with a user and/or transaction. For example, is the action typical for the user, has the user performed similar interactions in the past, is the receiving party an associate of the user, is the dollar amount about the same as what the user has withdrawn in the past, and so forth. In accordance with another implementation, the evaluation may be based on parameters external to the current interaction (e.g., is there a high level of fraud associated with a location where the interaction was initiated or at a location of a recipient, is the type of transaction one that is associated with a high level of fraud, and so on).

Based on a result of the evaluating, a security challenge may be activated at the device, at 508. For example, the security challenge may be a request for the user to answer a question posed in a prompt. In another example, the security challenge may be for the device (without the user being aware) to provide an external token, a third party token, a one time pass code, or another type of code or other information (e.g., information about the device, the environment, and so on). In a further example, the security challenge may be for the user to provide biometric information (e.g., voice sample, iris scan, fingerprint scan, and so on). Additional security challenges may be output although not specifically discussed herein.

At 510, performance of the interaction is selectively approved. If a response to the security challenge matches an expected response, the interaction is approved. However, if the response to the security challenge does not match (e.g., is unexpected), the interaction is denied. In this case, a communication link between the device and the financial website may be disabled or otherwise not allow the user to proceed further. According to some implementations, another security challenge may be output as a second (or subsequent) attempt to continue the interaction through the financial website).

Figure 6:
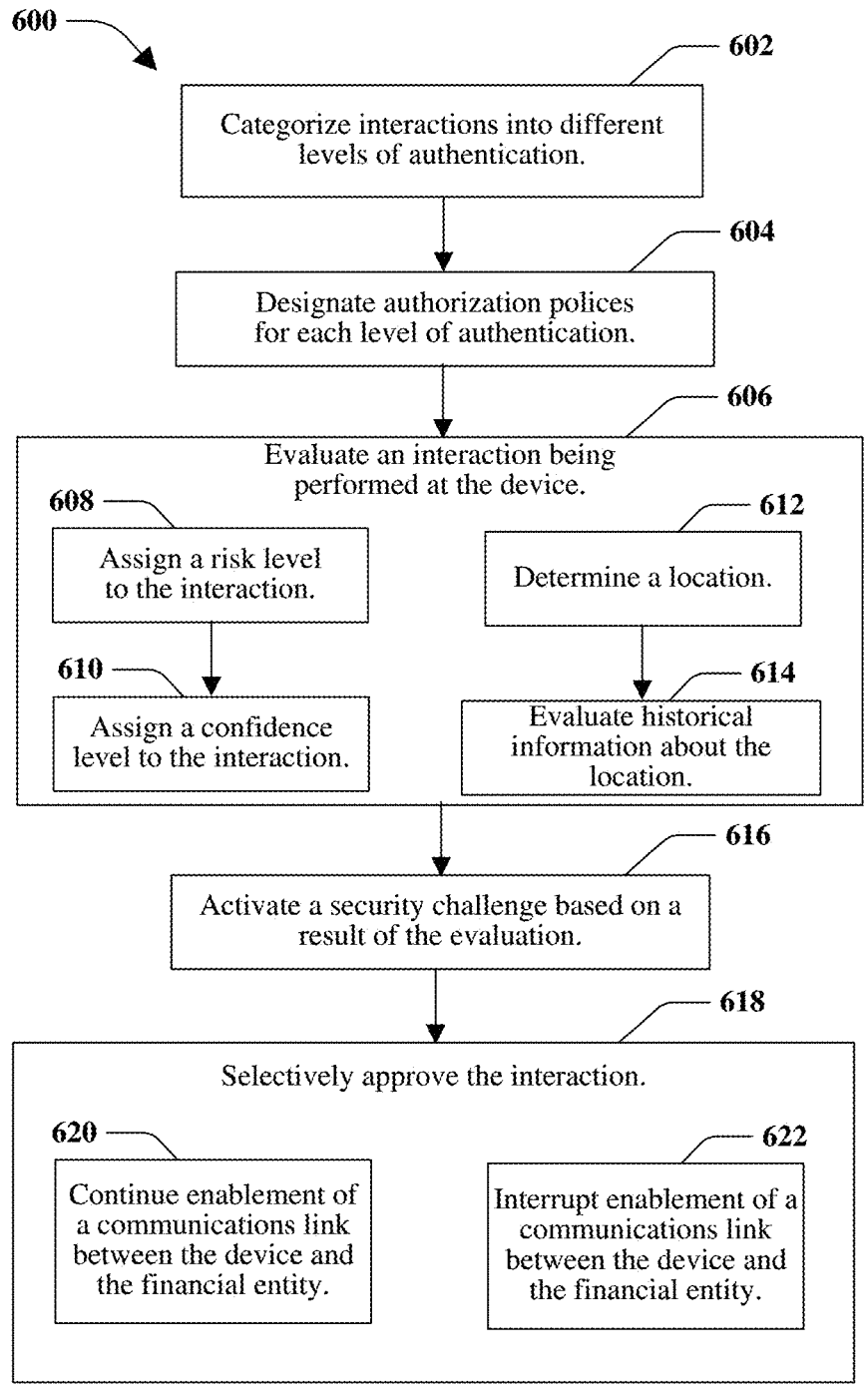
FIG. 6 illustrates an example, non-limiting method for flexible authentication, according to an aspect.

FIG. 6 illustrates an example, non-limiting method 600 for flexible authentication, according to an aspect. The method 600 in FIG. 6 may be implemented using, for example, any of the systems, such as the system 400 (of FIG. 4), described herein. According to some implementations, the methods discussed herein may be implementation by a computer-readable storage device that stores executable instructions that, in response to execution, cause a system comprising a processor to perform the various methods.

At 602, the various interactions that may be performed through interaction with a financial website are categorized into different levels of authentication. The various interactions may be performed at a device and may be enabled over a communications link (e.g., the Internet) to a financial entity or a trusted third party entity.

At 604, an authentication policy is designated for each level of authentication. The designation of the authentication policy may be based on rules and/or policies. Additionally or alternatively, each level of authentication may be assigned two or more authentication policies, wherein an authentication policy of the two or more authentication policies is selected based on a confidence level and/or a risk level associated with a particular interaction.

An interaction being performed at a device is evaluated, at 606. In some instances, a single session may have numerous interactions, each of which is evaluated according to the various aspects discussed herein. According to an implementation, the evaluation may include assigning a risk level to the interaction, at 608. The risk level may be based on a fraud trend associated with the interaction. Further to this implementation, at 610 a confidence level is assigned to the interaction. The confidence level may be based on a characteristic of the device, or an identity of a user of the device.

Alternatively or additionally, evaluating the interaction at 606 may include determining a location where initiation of the interaction occurs, at 612. For example, a determination may be made as to where a device through which the interaction is occurring is currently located. Further to this implementation, at 614, historical information associated with the location is evaluated. The evaluation may include associating fraud trends with the location and a frequency of occurrence of those trends.

In an alternate or additional implementation, determining the location at 612 may include determining an end location of the interaction (e.g., an entity or place where a wire transfer is being sent, where money is being deposited, from where a purchase is being made, and so on). Thus, the evaluation, at 614, includes evaluating the historical information about the end (or destination) location.

Method 600 continues at 616 when a security challenge is activated (or more than one security challenge are activated) at the device as a result of the evaluation. For example, if the evaluation indicates that the interaction is usual and what is expected, the interaction may be allowed to proceed without any further action (e.g., no security challenge output). However, if there is uncertainty about the interaction, or if something else (e.g., fraud trends, and so on) seems suspicious, a security challenge may be activated for response by the device (e.g., without user intervention) or by the user (e.g., the user actively doing something in response to the security challenge).

At 618, the interaction is selectively approved. According to an implementation, selectively approving the application may include continuing an enablement of the communications link between the device and the financial entity, at 620. For example, the enablement may be continued based on a determination that an expected response (e.g., the correct response) to the security question has been received.

According to an alternative implementation, at 622, the communications link between the device and the financial entity is disabled and/or interrupted. For example, the communications link may be interrupted (e.g., halted, stopped, paused, returned to previous screen or webpage, and so on). This interruption may be made based on a determination that a response to security challenge is unexpected (e.g., incorrect, not the expected iris scan as retained in memory, and so on).

Figure 7:
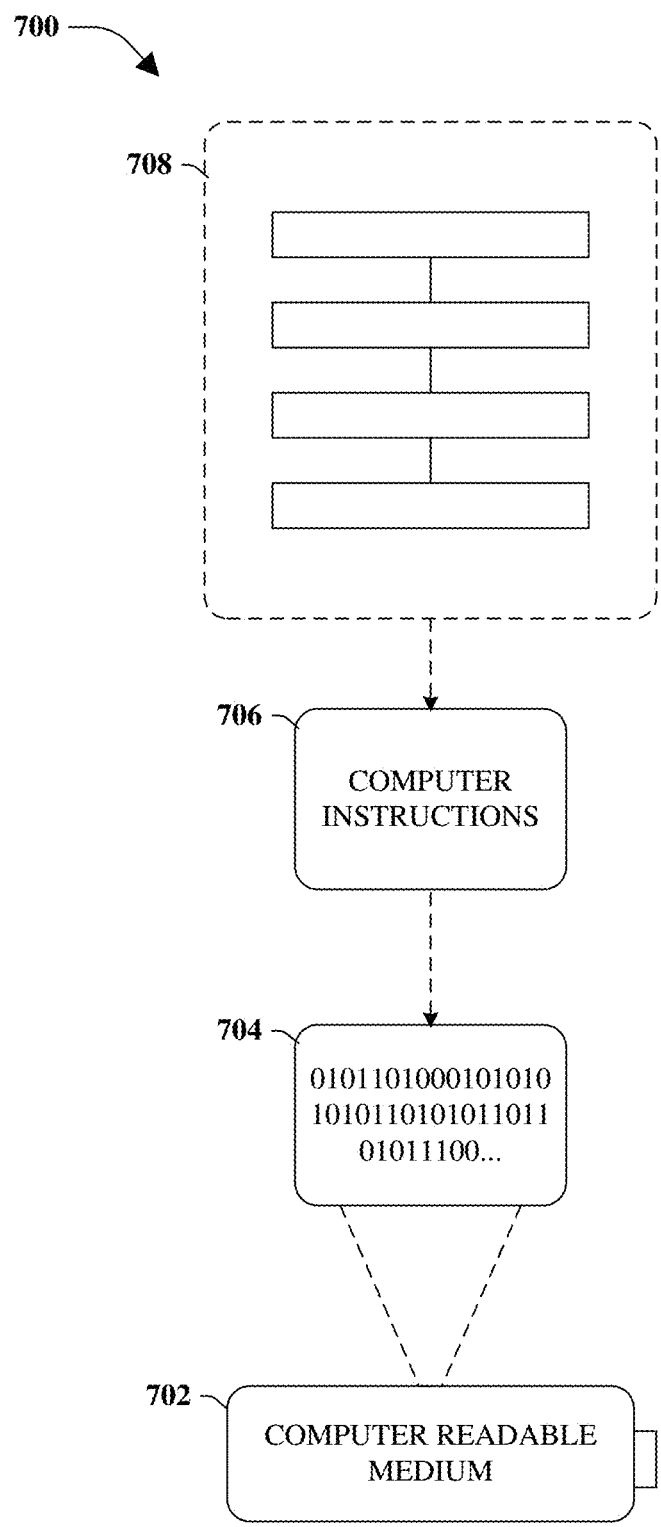
FIG. 7 illustrates an example, non-limiting computer-readable medium or computer-readable device including processor-executable instructions configured to embody one or more of the aspects set forth herein.

One or more implementations include a computer-readable medium including processor-executable instructions configured to implement one or more embodiments presented herein. An embodiment of a computer-readable medium or a computer-readable device devised in these ways is illustrated in FIG. 7, wherein an implementation 700 includes a computer-readable medium 702, such as a CD-R, DVD-R, flash drive, a platter of a hard disk drive, and so forth, on which is encoded computer-readable data 704. The computer-readable data 704, such as binary data including a plurality of zero's and one's as illustrated, in turn includes a set of computer instructions 706 configured to operate according to one or more of the principles set forth herein.

In the illustrated embodiment 700, the processor-executable computer instructions 706 may be configured to perform a method 708, such as the method 500 of FIG. 5 and/or the method 600 of FIG. 6, for example. In another embodiment, the processor-executable instructions 704 may be configured to implement a system, such as the system 200 of FIG. 2 and/or the system 300 of FIG. 3, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
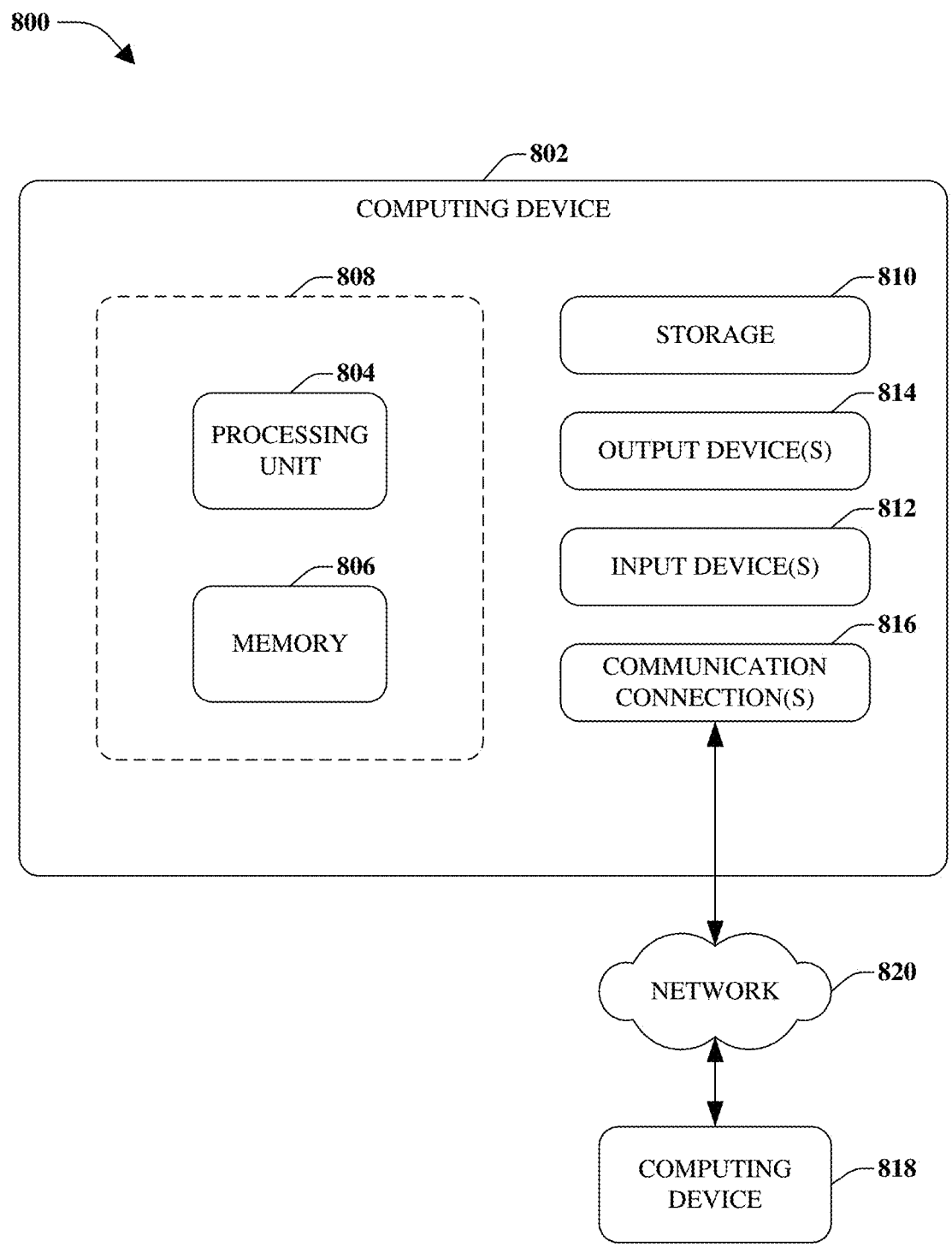
FIG. 8 illustrates an example, non-limiting computing environment where one or more of the aspects set forth herein are implemented, according to one or more embodiments.

FIG. 8 and the following discussion provide a description of a suitable computing environment to implement embodiments of one or more of the aspects set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 that may include a computing device 802 configured to implement one or more embodiments provided herein. In one configuration, the computing device 802 may include at least one processing unit 804 and at least one memory 806. Depending on the exact configuration and type of computing device, the at least one memory 806 may be volatile, such as RAM, non-volatile, such as ROM, flash memory, etc., or a combination thereof. This configuration is illustrated in FIG. 8 by dashed line 808.

In other embodiments, the device 802 may include additional features or functionality. For example, the device 802 may include additional storage such as removable storage or non-removable storage, including, but not limited to, magnetic storage, optical storage, etc. Such additional storage is illustrated in FIG. 8 by storage 810. In one or more embodiments, computer readable instructions to implement one or more embodiments provided herein are in the storage 810. The storage 810 may store other computer readable instructions to implement an operating system, an application program, etc. Computer readable instructions may be loaded in the at least one memory 806 for execution by the at least one processing unit 804, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 802 may include input device(s) 812 such as keyboard, mouse, pen, voice input device, touch input device, infrared cameras, video input devices, or any other input device. Output device(s) 814 such as one or more displays, speakers, printers, or any other output device may be included with the device 802. The input device(s) 812 and the output device(s) 814 may be connected to the device 802 via a wired connection, wireless connection, or any combination thereof. In one or more embodiments, an input device or an output device from another computing device may be used as the input device(s) 812 and/or the output device(s) 814 for the device 802. Further, the device 802 may include communication connection(s) 816 to facilitate communications with one or more other devices, illustrated as a computing device 818 coupled over a network 820.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method comprising:
    categorizing a set of interactions into different levels of authentication;
    designating an authentication policy for each level of authentication;
    evaluating an interaction of the set of interactions being performed at a device, wherein the interaction is performed over a communication link enabled between an entity and the device, and wherein evaluating the interaction includes:
        assigning a risk level based on whether the interaction indicates an anomaly relative to a historical pattern of interactions previously performed by the device,
        assigning a confidence level based on a characteristic of the device or an indicator of an identity of a user of the device, and
        assigning, for the interaction, a level of authentication based on the risk level and the confidence level, wherein assigning of the level of authentication includes: (i) identifying a set of rules associated with the interaction, the set of rules being defined by a matrix; (ii) selecting, from the matrix, a rule of the set of rules based on the assigned risk level and confidence level; and (iii) applying the rule to the interaction to determine at least one type of authentication required to authenticate the device before approving the interaction;
    as a result of the evaluating, causing a security challenge to be outputted at the device, wherein the security challenge comprises a prompt to perform a set of passive and active actions, wherein the set of passive and active actions are determined based on the at least one type of authentication identified by the level of authentication, wherein a passive action of the set of passive and active actions identifies an action to be performed by the device without user input, and wherein an active action of the set of passive and active actions identifies an action to be performed by the user of the device;
    authenticating the user of the device based on a result of the set of passive and active actions meeting a predetermined threshold for the level of authentication; and
    approving performance of the interaction at the device based on authenticating the user.

2. The method of claim 1, wherein approving performance of the interaction comprises continuing the enablement of the communications link between the device and the entity as a function of an expected response to the security challenge.

3. The method of claim 1, wherein not approving performance of the interaction comprises disabling the communications link between the device and the entity based on an unexpected response to the security challenge.

4. The method of claim 1, wherein assigning a confidence level to the interaction further comprises:
    determining a location where initiation of the interaction occurs; and
    evaluating historical information associated with the location.

5. The method of claim 1, further comprising requesting a third-party token or a biometric identification as at least a portion of the security challenge.

6. The method of claim 5, wherein the biometric identification is captured without alerting the user.

7. The method of claim 1, wherein the passive action comprises providing one or more of an external security token, a secure token, or a session token.

8. The method of claim 1, wherein the active action comprises receiving one or more of: audio from the user, an image of the user, or a response to a security question from the user.

9. The method of claim 8, wherein the image of the user comprises an image of one or more of the user's face, eye, or finger.

10. The method of claim 8, wherein the audio from the user is compared to a voiceprint of the user.

11. A system comprising:
a processor configured to:
categorize a set of interactions into different levels of authentication;
designate an authentication policy for each level of authentication;
evaluate an interaction of the set of interactions being performed at a device, wherein the interaction is performed over a communication link enabled between an entity and the device, and wherein evaluating the interaction includes:
assign a risk level based on whether the interaction indicates an anomaly relative to a historical pattern of interactions previously performed by the device,
assign a confidence level based on a characteristic of the device or an indicator of an identity of a user of the device, and
assign, for the interaction, a level of authentication based on the risk level and the confidence level, wherein assigning of the level of authentication includes: (i) identifying a set of rules associated with the interaction, the set of rules being defined by a matrix; (ii) selecting, from the matrix, a rule of the set of rules based on the assigned risk level and confidence level; and (iii) applying the rule to the interaction to determine at least one type of authentication required to authenticate the device before approving the interaction;
cause, as a result of the evaluating, a security challenge to be outputted at the device, wherein the security challenge comprises a prompt to perform a set of passive and active actions, wherein the set of passive and active actions are determined based on the at least one type of authentication identified by the level of authentication, wherein a passive action of the set of passive and active actions identifies an action to be performed by the device without user input, and wherein an active action of the set of passive and active actions identifies an action to be performed by the user of the device;
authenticate the user of the device based on a result of the set of passive and active actions meeting a predetermined threshold for the level of authentication; and
approve performance of the interaction at the device based on authenticating the user.

12. The system of claim 11, wherein approving performance of the interaction comprises continuing the enablement of the communications link between the device and the entity as a function of an expected response to the security challenge.

13. The system of claim 11, wherein not approving performance of the interaction comprises disabling the communications link between the device and the entity based on an unexpected response to the security challenge.

14. The system of claim 11, wherein assigning a confidence level to the interaction further comprises:
determining a location where initiation of the interaction occurs; and
evaluating historical information associated with the location.

15. The system of claim 11, wherein the processor is further configured to request a third-party token or a biometric identification as at least a portion of the security challenge.

16. The system of claim 15, wherein the biometric identification is captured without alerting the user.

17. The system of claim 11, wherein the passive action comprises providing one or more of an external security token, a secure token, or a session token.

18. The system of claim 11, wherein the active action comprises receiving one or more of: audio from the user, an image of the user, or a response to a security question from the user.

19. The system of claim 18, wherein the image of the user comprises an image of one or more of the user's face, eye, or finger.

20. A non-transitory computer readable medium comprising program code that when executed by one or more processors is configured to cause the one more processors to:
categorize a set of interactions into different levels of authentication;
designate an authentication policy for each level of authentication;
evaluate an interaction of the set of interactions being performed at a device, wherein the interaction is performed over a communication link enabled between an entity and the device, and wherein evaluating the interaction includes:
assign a risk level based on whether the interaction indicates an anomaly relative to a historical pattern of interactions previously performed by the device,
assign a confidence level based on a characteristic of the device or an indicator of an identity of a user of the device, and
assign, for the interaction, a level of authentication based on the risk level and the confidence level, wherein assigning of the level of authentication includes: (i) identifying a set of rules associated with the interaction, the set of rules being defined by a matrix; (ii) selecting, from the matrix, a rule of the set of rules based on the assigned risk level and confidence level; and (iii) applying the rule to the interaction to determine at least one type of authentication required to authenticate the device before approving the interaction;
cause, as a result of the evaluating, a security challenge to be outputted at the device, wherein the security challenge comprises a prompt to perform a set of passive and active actions, wherein the set of passive and active actions are determined based on the at least one type of authentication identified by the level of authentication, wherein a passive action of the set of passive and active actions identifies an action to be performed by the device without user input, and wherein an active action of the set of passive and active actions identifies an action to be performed by the user of the device;
authenticate the user of the device based on a result of the set of passive and active actions meeting a predetermined threshold for the level of authentication; and
approve performance of the interaction at the device based on authenticating the user.

* * * * *